Q. A. BRACKETT.
RECTIFIER SYSTEM.
APPLICATION FILED APR. 23, 1915.

1,321,505.

Patented Nov. 11, 1919.
2 SHEETS—SHEET 1.

WITNESSES:
O. J. Fitzgerald
D. C. Davis.

INVENTOR
Quincy Adams Brackett.
BY
Wesley G. Carr
ATTORNEY

Q. A. BRACKETT.
RECTIFIER SYSTEM.
APPLICATION FILED APR. 23, 1915.

1,321,505.

Patented Nov. 11, 1919.
2 SHEETS—SHEET 2.

WITNESSES:
R.J. Fitzgerald
D.C. Davis

INVENTOR
Quincy Adams Brackett.
BY
ATTORNEY

UNITED STATES PATENT OFFICE.

QUINCY A. BRACKETT, OF PITTSBURGH, PENNSYLVANIA, ASSIGNOR TO WESTINGHOUSE ELECTRIC AND MANUFACTURING COMPANY, A CORPORATION OF PENNSYLVANIA.

RECTIFIER SYSTEM.

1,321,505.  Specification of Letters Patent.  Patented Nov. 11, 1919.

Application filed April 23, 1915. Serial No. 23,427.

*To all whom it may concern:*

Be it known that I, QUINCY A. BRACKETT, a citizen of the United States, and a resident of Pittsburgh, in the county of Allegheny and State of Pennsylvania, have invented a new and useful Improvement in Rectifier Systems, of which the following is a specification.

My invention relates to current-rectifying systems, especially of the mercury-vapor type, and it has for its object to provide means whereby rectifiers of the type indicated may be started in a simple and effective manner.

Another object of my invention is to provide a current-supply system for rectifiers, wherein the voltage impressed upon the rectifier may be adjusted for the charging of storage batteries of various numbers of cells while the conditions in the starting circuit remain substantially unchanged.

Figure 1:
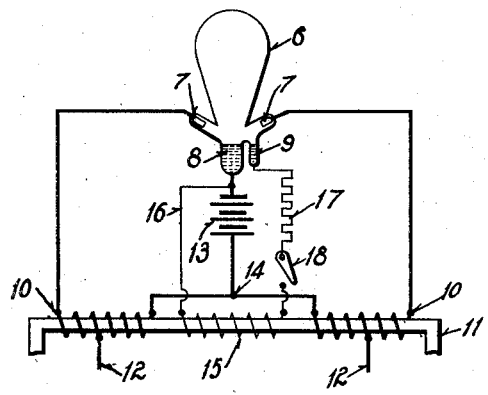

In the accompanying drawings, Figure 1 is a diagrammatic view of a rectifier of the vapor-arc type, together with its attendant starting, supply and load circuits; and Figs. 2, 3, 4 and 5 are diagrammatic views of rectifiers of the vapor-arc type provided with modified forms of supply circuits.

There are several commercial systems of storage battery charging and other low-voltage constant-potential rectifiers of the vapor-arc type. The simplest of these systems embodies means for connecting the starting anode to a suitable transformer tap through a regulating resistance member. The disadvantage of this system is that the starting spark current must be forced through the load battery, and, in the case of rectifiers designed for charging various numbers of cells, the regulating resistance or the transformer tap to which it is connected must be adjusted to suit the number of cells. To avoid this difficulty, I obtain my starting current from a separate winding mounted on the transformer core and connected to the auxiliary starting anode and to the main cathode, as will appear more fully from the following detailed description. By this system, I am enabled to adjust the voltage supplied to the rectifier to accord with the number of cells to be charged, without substantially altering the voltage supplied to the starting arc and without the necessity of including the load battery in the circuit of the starting current.

Referring to the form of my invention shown in Fig. 1, a rectifier 6 of the vapor-arc type is provided with main anodes 7, a main cathode 8 and an auxiliary starting anode 9. Current is supplied to the main anodes 7 from the terminals 10—10 of the secondary winding of an auto transformer 11 provided with suitable primary winding leads 12—12. Rectified current flows from the cathode 8 through a suitable load battery 13 to the mid point 14 of the secondary winding of the transformer 11. An auxiliary winding 15 is mounted on the core of the transformer 11 and is connected to the cathode 8 through a suitable wire 16 and to the starting anode 9 through a resistance member 17 and a switch 18.

At starting, current is supplied to the primary leads 12 and the switch 18 is closed, with the result that current is induced in the auxiliary winding 15 from the primary winding of the transformer 11 and impressed upon the electrodes 8 and 9. By slightly shaking the rectifier 6, the mercury in these two electrodes is caused to make and break contact and the negative electrode reluctance of the cathode 8 is destroyed, as is well known in the art. Current flow is initiated from the main anodes 7—7 and the switch 18 may be opened, whereupon the rectifier 6 remains in operation, being maintained by the inductions of the transformer 11 or, if desired, any suitable and well known maintaining device may be applied thereto.

When it is desired to charge varying numbers of storage batteries and, at the same time, to maintain uniform conditions in the starting circuit, it is necessary that the volts per turn of the transformer remain constant, that is, that the voltage adjustment for the different loads be obtained wholly by changes in the number of turns in the secondary winding of the transformer 11 without altering the number of turns in the primary winding thereof. I have shown such a system in Fig. 2, wherein the connections are identical with those of Fig. 1, with the exception that the anodes 7—7, instead of being connected directly to the terminal 10—10 of the secondary winding of the auto-transformer 11, are connected to suitable switch arms 19—19 adapted to make contact with different voltage taps 20—20 of the secondary winding. By suitable manipulation of the switch arms 19—19, any desired voltage may be impressed upon the rectifier 6 to accord with the number of cells to be charged and, at the same time, the voltage generated in the starting winding will remain constant, and conditions in the starting circuit will remain unchanged. It is desirable that the two switches 19 be manipulated by equal amounts in order to maintain the point 14 at substantially the middle of the secondary winding of the transformer 11, as, otherwise, the rectifier will not sustain as well, although this is not absolutely necessary.

Figure 2:
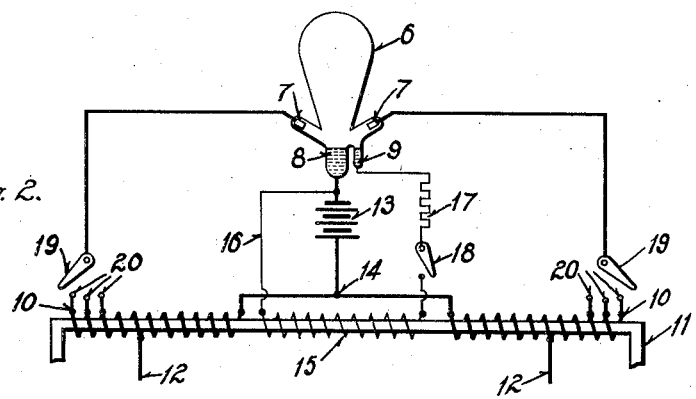
Figure 3:
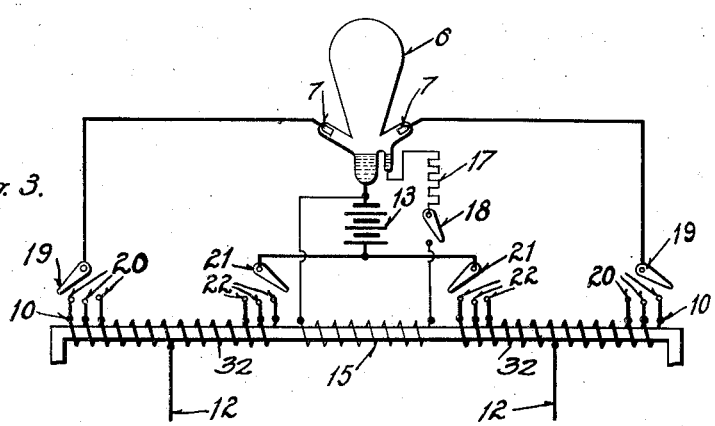

With the connections shown in Fig. 2, the switching devices 19—20 become unnecessarily large and cumbersome when a large number of voltage steps is desired, and it is therefore customary, in rectifier outfits, to provide transformers of the type indicated in Fig. 3 wherein suitable switching devices 21 are supplied for the variation of the number of turns in the portions 32 of the primary winding. By the proper and successive manipulation of the primary and secondary switching devices, a great number of voltage steps may be obtained in accordance with the principle of multiplication, as is well known in the art. This system of connection, however, has the great disadvantage, when employed with my invention, that any change in the number of turns in the primary winding disturbs the voltage in the starting circuit and hence necessitates adjustment of the latter. This system is therefore limited to its use to obtain only comparatively small voltage changes on the primary side of the transformer.

Figure 4:
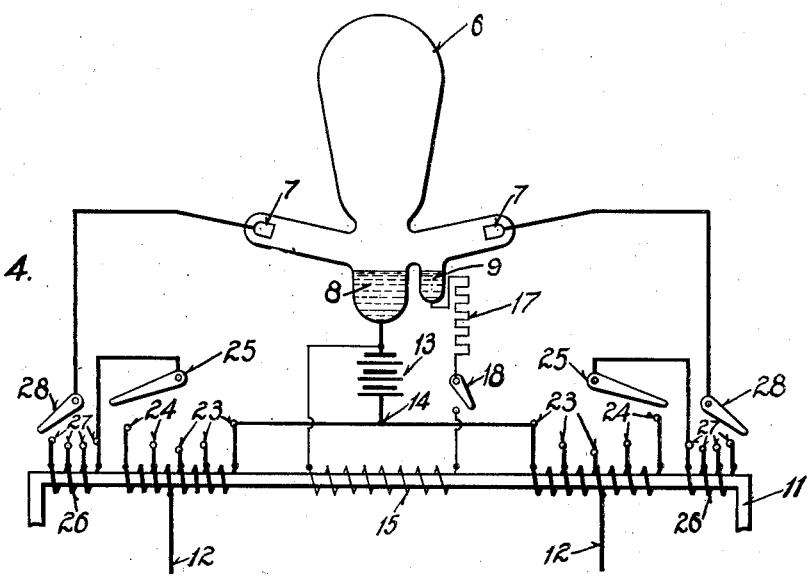

I may therefore connect as shown in Fig. 4 and obtain the advantages of a constant number of primary turns and, at the same time, secure the advantages of many voltage steps through the principle of multiplication. The number of primary turns included between the primary taps 12—12 is fixed, but these turns are provided with secondary voltage taps 23. The secondary voltage taps 24 are also provided outside the primary wires, and suitable switch arms 25 are mounted to coact with the voltage taps 23—24. Each of the switch arms 25 is connected to a suitable auxiliary secondary winding 26 mounted on the core member of the transformer 11, and each of these auxiliary secondary windings is provided with a plurality of taps 27—27. Suitable switch arms 28—28 make contact with the taps 27 and are connected to the main anodes 7. By the proper manipulation of the switch devices 25—25 and 28—28, a great number of voltage steps in the secondary winding is obtained and, at the same time, the volts per turn of the primary winding remain constant and the starting circuit is undisturbed.

Figure 5:
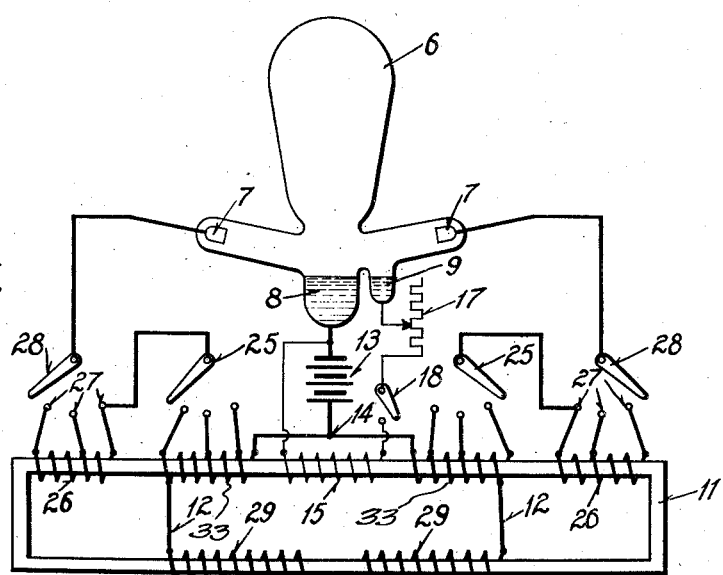

When employing extremely low ratios of transformation, it is not possible to operate the above-described combination successfully because the auxiliary secondary windings 26 would have a negligible number of turns and it therefore becomes necessary to resort to other means, as shown, for example, in Fig. 5. It would be possible to employ two-winding transformers but, on account of keeping the cost down, it is preferable to employ a compromise design. The primary winding, therefore, is made in two portions, one of which is included in the secondary winding, as is customary in auto transformers, and the other of which is a separate winding, as in two winding transformers. This allows turns to be varied on the secondary winding that are not a part of the primary winding and vice versa.

Referring to Fig. 5, the core member 11 of the transformer is provided with an auto transformer primary winding 33—33 between the leads 12—12, with auxiliary secondary windings 26, as is shown in Fig. 4, and also with a separate split primary winding 29—29 in which the number of turns may be varied by suitable switching devices 30—30 coacting with voltage taps 31—31. By manipulating the switching devices 28—28, the number of turns in the secondary winding may be varied without affecting the number of turns in the primary winding, by adjusting the switching devices 25—25 the number of turns in both primary and secondary windings is altered and if such a radical change in the number of cells to be charged is desired as to justify the adjustment of the current in the starting circuit by the rheostat 17, which is made variable for the purpose, the total number of primary turns may be altered by the manipulation of the switching devices 30—30 without affecting the number of secondary turns.

While I have shown my invention in five distinct modifications thereof, I do not desire to be restricted thereto but desire that only such restrictions shall be placed upon my invention as are imposed by the prior art or are specifically set forth in the appended claims.

I claim as my invention:

1. The combination with a vapor converter provided with main electrodes and with a starting anode, of a source of alternating current, means for supplying energy from said source to said main electrodes and to said starting anode, and means for varying the voltage of the energy supplied to said main electrodes without substantially modifying the voltage supplied to said starting anode.

2. The combination with a vapor rectifier provided with main electrodes and with a starting anode, of a transformer, connections for supplying energy to the rectifier from the main secondary winding of said transformer, an auxiliary secondary winding on said transformer, connections from said auxiliary winding to said starting anode and the main cathode for the sustenance of a starting arc, and means for varying the voltage of said main secondary winding without varying the voltage of said auxiliary secondary winding.

3. The combination with a vapor rectifier provided with main electrodes and with a starting anode, of a transformer, a source of alternating current of substantially constant voltage connected to the primary winding of said transformer, connections from the secondary winding of said transformer through the rectifier and a load, an auxiliary secondary winding on said transformer, connections from said auxiliary winding through said starting anode and the main cathode, and means for varying the ratio of transformation between the main primary and secondary windings without substantially affecting the ratio of transformation between said auxiliary secondary winding and the primary winding.

4. The combination with a vapor rectifier provided with main electrodes and with a starting anode, of a transformer, a source of alternating current of substantially constant voltage connected to the primary winding of said transformer, connections from the secondary winding of said transformer through the rectifier and a load, an auxiliary secondary winding on said transformer, connections from said auxiliary winding through said starting anode and the main cathode, and means for varying the number of effective turns in the main secondary winding without affecting the number of effective turns in the main primary winding or in the auxiliary secondary winding.

5. The combination with a vapor rectifier provided with main electrodes and with a starting anode, of a transformer, a source of alternating current of substantially constant voltage connected to the primary winding of said transformer, connections from the secondary winding of said transformer through the rectifier and a load, an auxiliary secondary winding on said transformer, connections from said auxiliary winding through said starting anode and the main cathode, a plurality of voltage taps on the main secondary winding, and a switching device associated with a main anode and adapted to make contact with any desired voltage tap.

6. The combination with a vapor rectifier provided with main electrodes and a starting anode, of a transformer, a source of alternating current of substantially constant voltage connected to the primary winding of said transformer, connections from the secondary winding of said transformer through the rectifier and a load, an auxiliary secondary winding on said transformer, connections from said auxiliary winding through said starting anode and the main cathode on the main secondary winding, a plurality of voltage taps on the main secondary winding, a switching device associated with a main anode and adapted to make contact with any desired voltage tap, an additional auxiliary secondary winding on said transformer, and means for inserting any desired portion of said last named auxiliary winding in the connection between said anode and said switching device.

7. The combination with a vapor rectifier, of a supply transformer therefor, means for simultaneously varying the number of primary and secondary turns in said transformer, and means for independently varying the number of secondary turns.

8. The combination with a vapor rectifier, of a supply transformer therefor, means for simultaneously varying the number of primary and secondary turns in said transformer, and means for independently varying either the primary or the secondary turns.

In testimony whereof, I have hereunto subscribed my name this 14th day of April, 1915.

QUINCY A. BRACKETT.